US010063647B2

United States Patent
Schneider et al.

(10) Patent No.: US 10,063,647 B2
(45) Date of Patent: Aug. 28, 2018

(54) SYSTEMS, APPARATUSES, AND METHODS FOR INTELLIGENT NETWORK COMMUNICATION AND ENGAGEMENT

(71) Applicant: Contact Solutions LLC, Reston, VA (US)

(72) Inventors: Ryan Schneider, Decatur, GA (US); James J. Dellostritto, Jordan, NY (US); Sameer Siddiqui, Ashburn, VA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

(21) Appl. No.: 15/392,313

(22) Filed: Dec. 28, 2016

(65) Prior Publication Data
US 2017/0195438 A1 Jul. 6, 2017

Related U.S. Application Data

(60) Provisional application No. 62/273,602, filed on Dec. 31, 2015.

(51) Int. Cl.
G06F 15/173 (2006.01)
H04L 29/08 (2006.01)

(52) U.S. Cl.
CPC ............ H04L 67/22 (2013.01); H04L 67/325 (2013.01)

(58) Field of Classification Search
CPC .................................. H04L 67/22; H04L 67/325
See application file for complete search history.

(56) References Cited

U.S. PATENT DOCUMENTS 4,797,925 A 1/1989 Lin
5,493,608 A 2/1996 O'Sullivan
(Continued)

FOREIGN PATENT DOCUMENTS

WO 2013/163169 10/2013

OTHER PUBLICATIONS

Balentine, B., "It's Better to Be a Good Machine Than a Bad Person: Speech Recognition and Other Exotic User Interfaces at the Twilight of the Jetsonian Age," ICMI Press, 2007.
(Continued)

Primary Examiner — Davoud Zand
(74) Attorney, Agent, or Firm — Meunier Carlin & Curfman

(57) ABSTRACT

Systems and methods directed to intelligent network communication and engagement during interaction with a consumer device. The progress of the consumer/consumer device can be tracked during interaction to make a decision to intervene based on one or more factors. The intervention may include invoking an appropriate, personalized request to the consumer for support. A consumer device can be employed to shop for a product via a mobile application provided by a retailer. For example, if the client has placed an item in a shopping cart, but does not completed the transaction, the context service can track events associated with the interaction and using an analysis service, and determine an appropriate time and/or manner to communicatively engage the user. As such, the context service can mimic a brick and mortar sales experience where sales associates determine the appropriate time to interact with a client who appears confused.

20 Claims, 13 Drawing Sheets

(56) References Cited

U.S. PATENT DOCUMENTS

| | | | |
|---|---|---|---|
| 5,553,121 A | 9/1996 | Martin et al. | |
| 5,562,453 A | 10/1996 | Wen | |
| 5,600,776 A | 2/1997 | Johnson et al. | |
| 5,615,257 A | 3/1997 | Pezzullo et al. | |
| 5,870,709 A | 2/1999 | Bernstein | |
| 5,874,962 A | 2/1999 | de Judicibus et al. | |
| 6,035,018 A | 3/2000 | Kaufman | |
| 6,069,939 A | 5/2000 | Fung et al. | |
| 6,146,147 A | 11/2000 | Wasowicz | |
| 6,226,364 B1 | 5/2001 | O'Neil | |
| 6,401,075 B1 | 6/2002 | Mason et al. | |
| 6,459,776 B1 | 10/2002 | Aktas et al. | |
| 6,462,759 B1 | 10/2002 | Kurtzberg et al. | |
| 6,487,277 B2 | 11/2002 | Beyda et al. | |
| 6,496,692 B1 | 12/2002 | Shanahan | |
| 6,704,873 B1* | 3/2004 | Underwood | H04L 63/02 709/223 |
| 6,718,535 B1* | 4/2004 | Underwood | G06F 9/451 717/101 |
| 6,856,333 B2 | 2/2005 | Ullmann et al. | |
| 6,907,546 B1* | 6/2005 | Haswell | G06F 11/3684 714/38.11 |
| 6,981,242 B2 | 12/2005 | Lehmeier et al. | |
| 6,985,865 B1 | 1/2006 | Packingham et al. | |
| 7,024,366 B1 | 4/2006 | Deyoe et al. | |
| 7,039,168 B1 | 5/2006 | Potts | |
| 7,065,188 B1 | 6/2006 | Mei et al. | |
| 7,100,195 B1* | 8/2006 | Underwood | G06F 9/451 726/2 |
| 7,143,029 B2 | 11/2006 | Elshafei | |
| 7,146,419 B1 | 12/2006 | O'Rourke et al. | |
| 7,194,409 B2 | 3/2007 | Balentine et al. | |
| 7,221,933 B2 | 5/2007 | Sauer et al. | |
| 7,224,790 B1 | 5/2007 | Bushey et al. | |
| 7,415,100 B2 | 8/2008 | Cooper et al. | |
| 7,457,395 B2 | 11/2008 | Creamer et al. | |
| 7,498,860 B2 | 3/2009 | Bhattacharya | |
| 7,515,695 B1 | 4/2009 | Chan et al. | |
| 7,519,049 B2 | 4/2009 | Masuda | |
| 7,573,986 B2 | 8/2009 | Balentine et al. | |
| 7,620,894 B1 | 11/2009 | Kahn | |
| 7,653,543 B1 | 1/2010 | Blair et al. | |
| 7,665,024 B1 | 2/2010 | Kondziela | |
| 7,729,915 B2 | 6/2010 | Balentine et al. | |
| 7,787,543 B2 | 8/2010 | Yamaguchi | |
| 7,808,918 B2 | 10/2010 | Bugenhagen | |
| 7,809,569 B2 | 10/2010 | Attwater et al. | |
| 7,817,784 B2 | 10/2010 | Wang et al. | |
| 7,836,409 B2 | 11/2010 | Denoue et al. | |
| 7,865,841 B2 | 1/2011 | Morikawa | |
| 7,903,792 B2 | 3/2011 | Balentine et al. | |
| 7,904,387 B2 | 3/2011 | Geering | |
| 7,920,682 B2 | 4/2011 | Byrne et al. | |
| 7,970,615 B2 | 6/2011 | Attwater et al. | |
| 8,000,689 B2 | 8/2011 | Featherstone et al. | |
| 8,046,420 B2 | 10/2011 | Pan | |
| 8,068,609 B2 | 11/2011 | Puranik et al. | |
| 8,090,867 B2 | 1/2012 | Katis et al. | |
| 8,094,788 B1 | 1/2012 | Eberle et al. | |
| 8,096,657 B2 | 1/2012 | Pompilio et al. | |
| 8,107,999 B2 | 1/2012 | Pandruvada | |
| 8,131,553 B2 | 3/2012 | Attwater et al. | |
| 8,155,948 B2 | 4/2012 | Ruano et al. | |
| 8,213,579 B2 | 7/2012 | Balentine et al. | |
| 8,223,945 B2 | 7/2012 | Drovdahl et al. | |
| 8,233,613 B1 | 7/2012 | Michaelis et al. | |
| 8,254,552 B2 | 8/2012 | Harton et al. | |
| 8,880,631 B2 | 11/2014 | Logan et al. | |
| 8,918,506 B1* | 12/2014 | Clubb | G06Q 40/02 709/223 |
| 9,082,297 B2* | 7/2015 | Alexander | G08C 23/04 |
| 9,618,359 B2* | 4/2017 | Weast | G01C 21/3697 |
| 9,674,123 B2* | 6/2017 | LaPine | H04L 51/066 |
| 2002/0080938 A1 | 6/2002 | Alexander, III et al. | |
| 2002/0090062 A1 | 7/2002 | Alhadad et al. | |
| 2002/0116466 A1 | 8/2002 | Trevithick et al. | |
| 2002/0124258 A1 | 9/2002 | Fritsch | |
| 2002/0164004 A1* | 11/2002 | Tamura | G06Q 30/02 379/93.12 |
| 2003/0064716 A1 | 4/2003 | Galley et al. | |
| 2003/0191639 A1 | 10/2003 | Mazza | |
| 2004/0045036 A1 | 3/2004 | Terasaki | |
| 2004/0258223 A1 | 3/2004 | Rahamim | |
| 2005/0047556 A1 | 3/2005 | Somerville et al. | |
| 2005/0058149 A1 | 3/2005 | Howe | |
| 2005/0100022 A1 | 5/2005 | Ramprashad | |
| 2006/0034287 A1 | 2/2006 | Novack et al. | |
| 2006/0036442 A1 | 2/2006 | Novack et al. | |
| 2006/0126803 A1 | 6/2006 | Patel et al. | |
| 2006/0271367 A1 | 11/2006 | Hirabayashi et al. | |
| 2007/0036323 A1 | 2/2007 | Travis | |
| 2007/0053346 A1 | 3/2007 | Bettis et al. | |
| 2007/0119923 A1 | 5/2007 | Garrison et al. | |
| 2007/0250318 A1 | 10/2007 | Waserblat et al. | |
| 2008/0004881 A1 | 1/2008 | Attwater et al. | |
| 2008/0123627 A1 | 5/2008 | Moreman et al. | |
| 2008/0216172 A1 | 9/2008 | Forman et al. | |
| 2009/0327422 A1 | 12/2009 | Katis et al. | |
| 2010/0002692 A1 | 1/2010 | Bims | |
| 2010/0166158 A1 | 7/2010 | Costello et al. | |
| 2010/0306083 A1* | 12/2010 | Oren | G06Q 30/04 705/26.25 |
| 2010/0310059 A1 | 12/2010 | Davis et al. | |
| 2011/0159854 A1 | 6/2011 | Kedefors et al. | |
| 2011/0164744 A1 | 7/2011 | Olshansky et al. | |
| 2012/0209630 A1 | 8/2012 | Ihm et al. | |
| 2012/0310652 A1 | 12/2012 | O'Sullivan | |
| 2012/0316403 A1* | 12/2012 | Hogan | G06F 19/3481 600/300 |
| 2013/0069858 A1 | 3/2013 | O'Sullivan | |
| 2013/0070910 A1 | 3/2013 | O'Sullivan | |
| 2013/0282844 A1 | 10/2013 | Logan et al. | |
| 2014/0137200 A1 | 5/2014 | Logan et al. | |

OTHER PUBLICATIONS

International Preliminary Report on Patentability and Written Opinion, dated Oct. 28, 2014, received in connection with International Patent Application No. PCT/US2013/037779.

International Search Report, dated Jul. 5, 2013, received in connection with International Patent Application No. PCT/US2013/037779.

\* cited by examiner

SYSTEMS, APPARATUSES, AND METHODS FOR INTELLIGENT NETWORK COMMUNICATION AND ENGAGEMENT

BACKGROUND

This application claims priority to U.S. Provisional Patent Application No. 62/273,602, filed Dec. 31, 2015, entitled "Systems, Apparatuses, and Methods for Intelligent Network Communication and Engagement," which is incorporated herein by reference in its entirety.

BACKGROUND

Online communication, regardless of whether it occurs over a desktop-based web browser or via a mobile application on a Smartphone, typically includes asynchronous and/or discontinuous exchanges between two interacting devices/systems, such as a consumer device (e.g., associated with a consumer) and a server (e.g., associated with a business/website). Typically, the consumer device is interacting with the server with the intent of completing a task, transaction, and/or goal.

For example, in an e-commerce setting, this can include the consumer attempting to make a purchase from the business/server via the device. During the interaction, the consumer can have questions (e.g., about the product, a specific feature of the website, and/or the like), and the interaction can stall. At this point, in traditional "brick and mortar" sales, a business sales associate would determine that an engagement with the consumer would be beneficial, such as by approaching the consumer and asking if the consumer has any questions, needs help, etc. Some online approaches attempt to mimic such an engagement via chat requests that pop-up in a web page, asking if the consumer would like support. Such solutions are not intelligent and can feel disruptive to the consumer, often causing them to decline an opportunity to chat and inadvertently causing request fatigue. Some online approaches include making a request to the consumer almost immediately after the consumer stops interacting with the website, or after a short delay, both of which are invasive, and often cause request fatigue.

Thus, a need exists for systems, apparatuses, and methods for intelligent communication and engagement with a consumer over a network.

DETAILED DESCRIPTION

Figure 1:
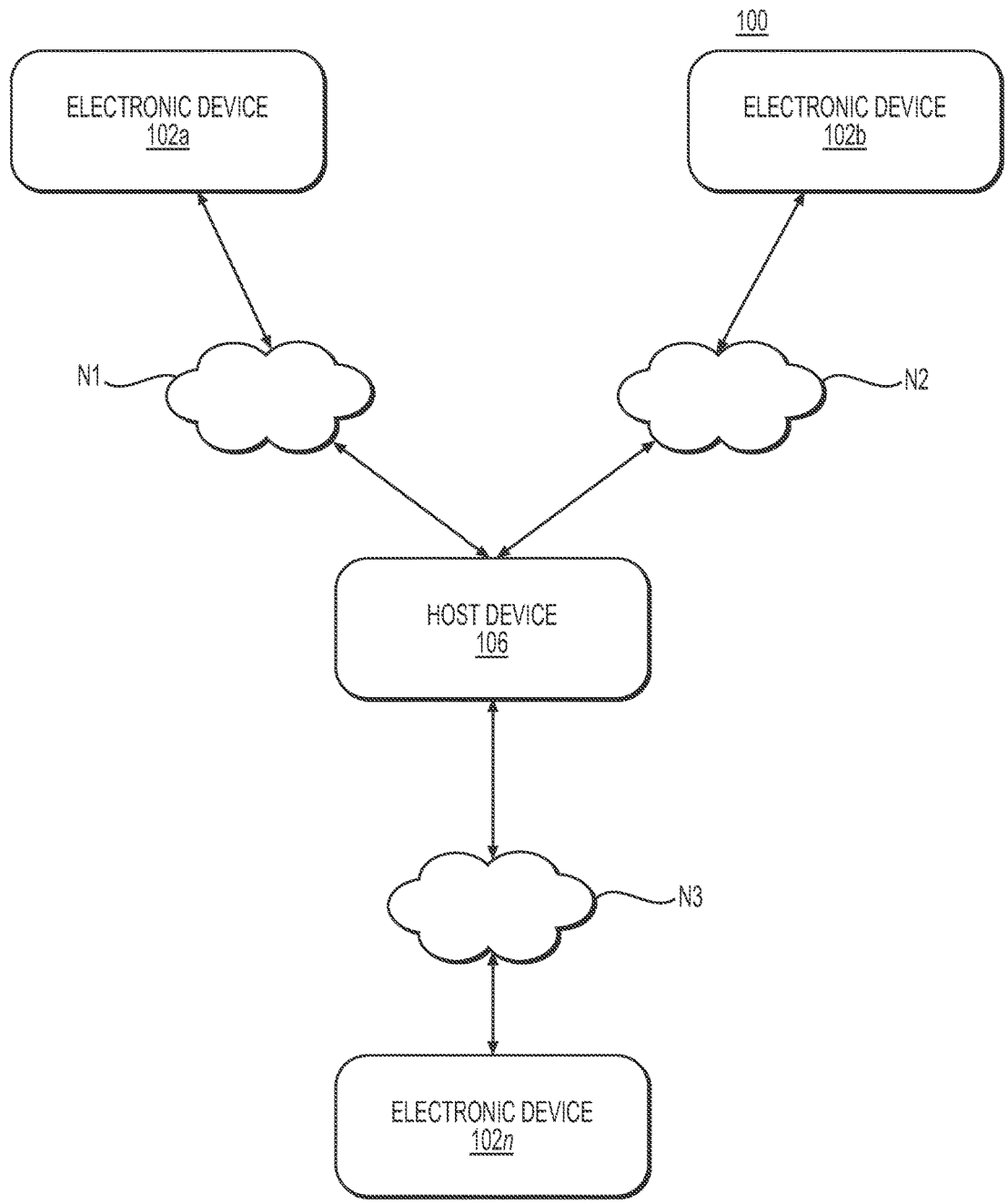
FIG. 1 illustrates an environment within which aspects of a host device can be employed, according to embodiments.

Aspects of the systems, apparatuses, methods disclosed herein (also referred to as "context service(s)", and variants thereof) are directed to intelligent network communication and engagement during interaction with a consumer device. In some embodiments, aspects disclosed herein can track the progress of the consumer/consumer device during interaction (e.g., during a potential transaction), make a decision to intervene based on one or more factors (e.g., how far along the client is in the transaction process), and take one or more actions, such as invoking/initiating an appropriate, personalized request to the consumer for support at the appropriate time.

It is understood that the terms "business", "business server", "electronic device" (see FIG. 1, explained later), "user device", and/or variants thereof, can refer to any suitable device/entity interacting with the context service, and providing event information to the context service. In some embodiments, a consumer device interacts with the user device (i.e., used by a direct user of the context service), resulting in events that are consumed and analyzed by the context service. As an example, the user device can be associated with the online vendor eBay.com, and the consumer device can be associated with an eBay customer. Event information is generated by the eBay.com user device (i.e., the direct user of the context service) based on the activity of the eBay consumer, and transmitted to the context service. In some embodiments, the user device and/or the consumer device can independently be any entity embedded with one or more of electronics, software, sensors, and network connectivity components to enable generation, receipt, and/or interchange of electronic data. Suitable examples of such entities include, but are not limited to, wearable devices such as smart watches, personal fitness monitors, medical devices such as heart monitors, appliances, TVs, and/or the like.

In other embodiments, the user device can be the same as the consumer device, and event information is generated based on the interaction between the consumer device and the context service. In such an embodiment, the consumer device directly accesses and uses the context service.

In some embodiments, aspects of the systems, apparatuses, methods disclosed herein can track the activity/interaction between the consumer device and the user device, and determine and/or identify when engagement is required or desirable to finish the transaction via a personalized, proactive engagement request. In an example embodiment, a consumer device can be employed to shop for a product via a third-party mobile application, such as a Smartphone application provided by an online retailer associated with the user device. The client has placed an item in their shopping cart and has not completed the transaction, but continues to browse other product pages. The context service can track events associated with the interaction, such as what pages they have visited what they have placed in the shopping cart, and/or the like. In some embodiments, using an analysis service implementing a finite state machine, the context service can calculate and/or determine an appropriate time and/or manner to communicatively engage the user, such as, for example, to suggest support via a personal message to the client, such as a pop-up message. In this manner, the context service can mimic an offline/brick and mortar sales experience, where sales associates are able to determine the appropriate time to interact with a client who appears confused. By understanding client progress, the context service can invoke support.

In some embodiments, aspects of the systems and apparatuses disclosed herein are configured to execute a gathering stage/step, where information associated with events/finite states is gathered/collected. Suitable examples of such events include, but are not limited to, the consumer adding a product to the shopping cart, the consumer being unresponsive for a predetermined period of time, the consumer starts/stops monitoring of his workout by a Smartphone application, a fitness and/or mapping Smartphone application detects that the user is in proximity of the user's gym, and/or the like. In some embodiments, such as in the case of the consumer shopping on a retailer Smartphone application associated with the user device, the events are based on event information as provided by the third party's Smartphone application.

In some embodiments, aspects of the systems and apparatuses disclosed herein are further configured to execute a monitoring stage/step, where received event information is monitored to identify one or more triggers.

In some embodiments, aspects of the systems and apparatuses disclosed herein are further configured to execute an invocation stage/step where, an analysis service (e.g., a finite state machine) can use multiple interaction points between the consumer device and the user device, and associated triggered events, to determine if one or more predetermined criterion/condition are met, and to initiate one or more actions based on the determination such as, for example, invoking a request returned to the consumer device with a "personalized" message inviting the consumer to chat, initiating a telephone call to the user, sending an email to the user, messaging the user with a reminder to attend an upcoming gym class, and/or the like.

An example high level process is provided here merely to provide a commonly-experienced context to the more general description that follows. A consumer engages a user device (e.g., an e-commerce company) described herein, and a session is initiated and/or created. The consumer begins to interact with the company's products or service offering. During specific events (e.g., interaction with certain products, browsing history, time associated with a product in a shopping cart, etc.), the user device transmits the event information to a context service as described herein (e.g., the consumer adds a product to a shopping cart and/or navigates to a particular page). It is understood that transmission, reception, manipulation and/or otherwise (for simplicity) handling of events by the various systems, devices, and/or modules disclosed herein can encompass handling of any suitable indication associated with the event, such as, but not limited to, event information, event data structures, event data objects, event list(s), and/or the like.

After a received event threshold is met at the context service, e.g., an item has been in a shopping cart for a predetermined amount of time, the event information can be forwarded to a state machine, which analyzes the event information associated with one or more events. Based on the analysis, the state machine generates a message and sends the message to the user device (e.g., the direct user of the context service), which in turn transmits the message to the consumer. An invitation to chat is shown to the consumer with a personalized message. An example message that can be triggered by a shopping cart 'add' event can include: "We see you are shopping for a TV and may be ready to make a purchase. If you have further questions about TV model name a representative can assist you." In this manner, a series of actionable events can be used to identify appropriate points in the process of service where support could be beneficial to help secure the sale or commitment from a consumer.

As used in this specification, the singular forms "a," "an" and "the" include plural referents unless the context clearly dictates otherwise. Thus, for example, the term "a module" is intended to mean a single module or a combination of modules, "a network" is intended to mean one or more networks, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

Figure 2:
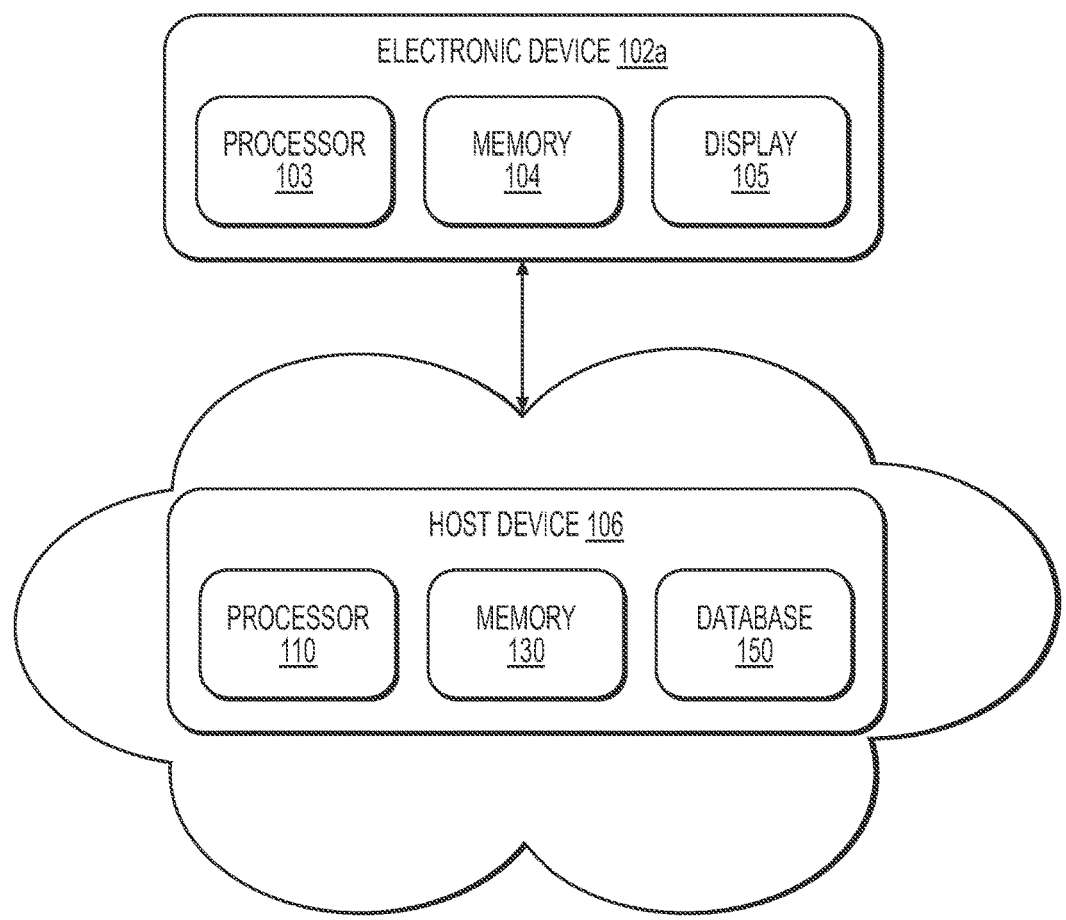
FIG. 2 illustrates the host device and the user/electronic device of FIG. 1, according to embodiments.

FIG. 1 illustrates a system/environment 100 for engagement of the consumer, according to an embodiment, and includes several electronic devices 102a, 102b, ... 102n (referred to hereon as "user devices"), and a host device 106 interconnected by the networks N1, N2, ... N3, respectively. In some embodiments, the host device 106 implements at least some aspects of the context service, as described herein. In some embodiments, the user devices 102a, 102b, ... 102n represent devices configured to interact with the host device 106/context service for user engagement, as described herein. As best illustrated in FIG. 2, in some embodiments, the host device 106 includes at least a processor and a memory, and can further include a database, although it is understood that, in some embodiments, the memory and the database can be the same component. In some embodiments, the database constitutes one or more databases. Further, in other embodiments (not shown), at least one database can be external to the host device 106 and/or the system 100. The host device 106 can be a personal computer, a server, a workstation, a tablet, a mobile device, a cloud computing environment (e.g., including one or more servers, processors, etc.), an application or a module running on any of these platforms, and/or the like.

The memory and/or the database of the host device 106 can independently be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory and/or the database can store instructions to cause the processor to execute modules, processes and/or functions associated with the host device 106.

The user devices 102a-102n (also referred to as electronic devices) are associated with users of the host device 106, although it is understood that, in some embodiments, the user devices 112a-112n can represent hardware/software interfaces (e.g., a compute device, a land or mobile phone, a web interface, a mobile phone interface, a server, and/or the like) interacting with the system 100, and/or the like. For example, the user device 102*a* can be a mobile phone employed by a user/owner of the phone. For another example, the user device 102*a* can be a server hosting a website that interacts with the context service executing at the host device 106. As also illustrated in FIG. 2, an example user device 102*a* includes at least a processor and a memory, and can further include a user interface, such as a visual display. As described later, in some embodiments, a user device can include a listener component/module configured for intermittently, periodically and/or continuously monitoring for communication from a help topic component/module of the host device 106.

Each of the networks N1 . . . N3 can independently be any type of network such as, for example, a local area network (LAN), a wide area network (WAN), a virtual network, a telecommunications network, a data network, and/or the Internet, implemented as a wired network and/or a wireless network. In some embodiments, any or all communications can be secured using any suitable type and/or method of secure communication (e.g., secure sockets layer (SSL)) and/or encryption. In other embodiments, any or all communications can be unsecured.

In some embodiments, aspects of the system 100 and/or the host device 106 are operable to monitor how quickly and accurately a user is responding via an input device, such as generally disclosed in U.S. Patent Application Publication No. 2013/0069858 titled "ADAPTIVE COMMUNICATIONS SYSTEM", filed Aug. 26, 2005; and in U.S. Patent Application Publication No. 2013/0070910 titled "ADVANCED ADAPTIVE COMMUNICATIONS SYSTEM (ACS)", filed Jul. 10, 2008, the entire disclosures of which are incorporated herein by reference. In some embodiments, aspects of the system 100 are operable to determine how and/or when to engage the consumer based on the location of the consumer, such as based on the geo-location of the consumer device. In some embodiments, aspects of the system 100 are operable to identify one or more communication customs based on the identified location of the consumer, and to engage the consumer based on the communication custom(s), which can influence, for example, choice of language, a duration of a timeout before the consumer is engaged, and/or the like. In some embodiments, aspects of the system 100 are operable to automatically monitor and learn from normal in-use behavior exhibited by a human consumer, such as generally disclosed in U.S. Patent Application Publication No. US2012/0310652 titled "ADAPTIVE HUMAN COMPUTER INTERFACE (AAHCI)", filed Jun. 1, 2009, the entire disclosure of which is incorporated herein by reference. In some embodiments, aspects of the system 100 are operable for multi-mode asynchronous communication, such as generally disclosed in U.S. Patent Application Publication No. 2013/0282844 titled "APPARATUS AND METHODS FOR MULTI-MODE ASYNCHRONOUS COMMUNICATION", filed Mar. 12, 2013, the entire disclosure of which is incorporated herein by reference. In this manner, the user can be engaged using multiple approaches such as, for example, two or more of an email, a text message, a pop-up window, an audible notification, and/or the like. In some embodiments, aspects of the system 100 are operable for communication flow modification, such as generally disclosed in U.S. Provisional Application No. 61/936,639 titled "SYSTEMS, APPARATUSES AND METHODS FOR COMMUNICATION FLOW MODIFICATION", filed Feb. 6, 2014, the entire disclosure of which is incorporated herein by reference.

Figure 3:
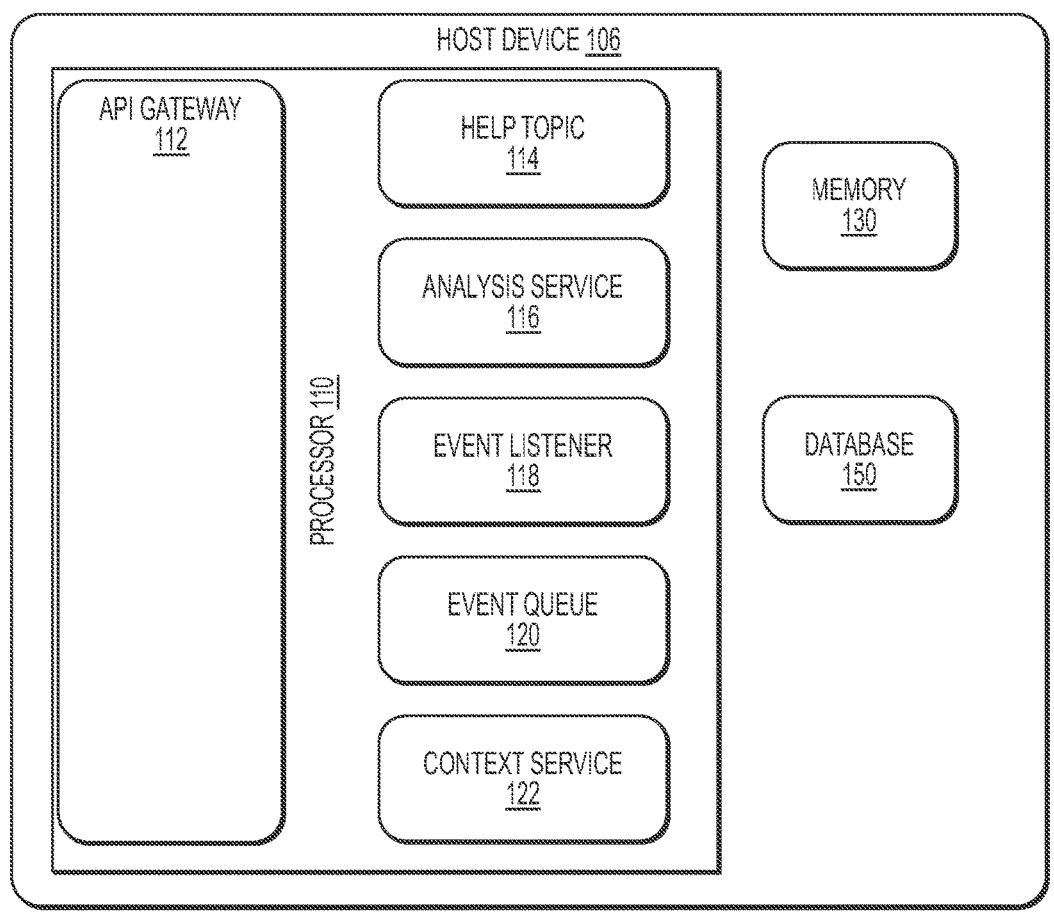
FIG. 3 illustrates components of the host device of FIG. 1, according to embodiments.

Referring to the host device 106, the processor of the host device can be, for example, a general purpose processor, a Field Programmable Gate Array (FPGA), an Application Specific Integrated Circuit (ASIC), a Digital Signal Processor (DSP), and/or the like. The processor can be configured to run and/or execute application processes and/or other modules, processes and/or functions associated with the host device 106, with the system 100, and/or the network. As illustrated in FIG. 3, the processor of the host device 106 can include an API (Application Program Interface) gateway 112, a help topic 114, a context service 122, an event queue 120, an event listener 118, and a analysis service 116. In some embodiments, the processor can include additional components/modules (not shown). Each component and/or module 112, 114, 122,120, 118 and 116 can independently be a hardware component/module and/or a software component/module (implemented in hardware, such as the processor). In some embodiments, each of the components/modules can be operatively coupled to each other. In other embodiments, the functionality of one or more of the components/modules can be combined and/or overlap. In some embodiments, the functionality of one or more components/modules and/or the interaction between the components/modules can be based on regulatory requirements for data processing, storage, integrity, security, and/or the like. While shown as being implemented in the processor, in other embodiments, the components/modules, or a portion thereof, can be distributed, and implemented in other processors and/or network devices. Such processors and/or network devices can be communicatively coupled via, for example, a network.

In some embodiments (not shown), the host device 106 can include one or more communication components/modules configured to facilitate network connectivity for the host device 106 and/or system 100. For example, the communication component/module can include and/or enable a network interface controller (NIC), wireless connection, a wired port, and/or the like. As such, the communication component/module can establish and/or maintain a communication session with any of the user devices 102*a*-102*n*. Similarly stated, the communication component/module can enable the host device 106 to send data to and/or receive data from the user devices 102*a*-102*n*. In some embodiments (not shown), the host device 106 can include a database component/module configured to interface with the memory and/or the database of the host device 106 for data manipulation (including storage, modification, and/or deletion).

In some embodiments, the API gateway 112 is configured for securing communications to and from the host device 106. In this manner, when the host device 106 operates within a computer domain and/or other secured computer network, it communications can be secure at the domain level.

In some embodiments, the help topic 114 is configured to define and/or create, for each user/consumer session, a topic/entry to which the corresponding user device 102*a*-102*n* can subscribe and/or send event messages (that includes event information, or an indication thereof) associated with the user/consumer. In some embodiments, the help topic 114 is further configured to transmit messages to a specific user device with which an active session is associated.

In some embodiments, the context service 122 is configured as a receiver/controller to which event messages are sent for storage (e.g., in the memory and/or the database, either directly or via a database module), and is further configured for transmitting the event messages to the event queue 120. In some embodiments, the context service 122 is further configured for transmitting the event messages to the memory 130 and/or the database 150.

In some embodiments, the event queue 120 is configured to receive the event messages from the context service 122, and is further configured to generate, maintain, and/or otherwise manipulate a queue for storing the received event messages. The event queue 120 is further configured to, if one or more conditions are met, forward the event message(s) to the event listener 118. In some embodiments, the event messages(s) are forwarded to the event listener 118 in response to a request from the event listener 118.

In some embodiments, the event listener 118 is configured to pull and/or otherwise initiate transfer of the event messages from the event queue 120, at which point the transferred event messages are deleted from the event queue 120. In some embodiments, the event listener 118 is configured to analyze the received events to determine if one or more conditions are met. When the one or more conditions are met, the event listener 118 is further configured to forward the event message to the analysis service 116.

In some embodiments, the analysis service 116 is configured to receive one or more event messages from the event queue module. In some embodiments, the analysis service 116 is configured to receive multiple event messages as a single set/batch, and is further configured to analyze the received set of event messages. In some embodiments, the analysis service 116 is configured to analyze the received set of event messages based on any suitable approach, including deterministic (e.g., finite state models, directed graphs, and/or the like) and/or probabilistic (e.g., Bayesian networks, neural networks, and/or the like) approaches. In some embodiments, the analysis service 116 is configured to analyze the received set of event messages based on a finite state model of possible events. In this manner, when the number of event messages is known and limited (e.g., when a third party application provides known, limited event messages to the host device 106), the analysis service 116 can provide an analytical solution without computational complexity. In some embodiments, the analysis service 116 is configured to, base on the analysis, identify if one or more actions is to be taken. For example, the analysis service 116 can identify a help topic (e.g., stored in the memory and/or database of the host device 106) that can be transmitted back to the user device from where the originating event(s) arose.

Figure 4:
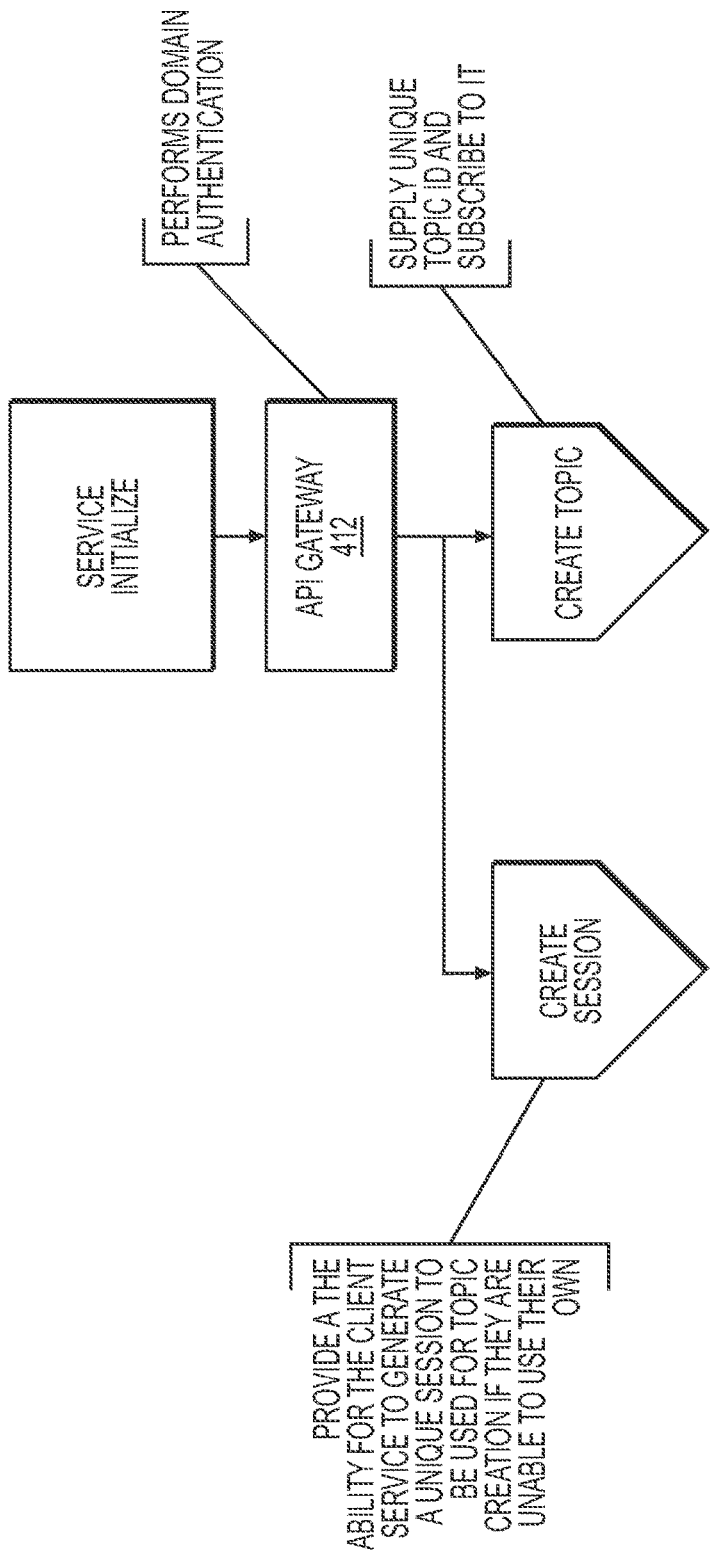
FIG. 4 illustrates example operation of an API gateway, according to embodiments.

FIG. 4 is an example embodiment illustrating initiation of event tracking by the host device 106. Event tracking can be initialized for each individual consumer session by the API gateway 412, such as when the consumer is using a particular Smartphone application and/or is browsing a particular e-commerce website. As an example, an e-commerce website can have 1000 consumers actively browsing and placing items in their shopping cart. Each individual consumer session can be tracked. To initiate tracking for a particular consumer, the corresponding user device defines and/or creates a unique session, including a new session identifier (referred to hereon as a "session ID"), to retrieve or create a new session to be monitored for events. Such a session ID can be based on, for example, an internet protocol (IP) address of the consumer device, an IP address of the host device, a port identifier associated with the user device, a port identifier associated with the host device, and/or the like. Once defined and/or created, the unique session ID can be used to create a help topic (e.g., via the help topic 114) associated with the session that is subscribed to by the associated user device. In some instances, the session ID can be transmitted to the associated user device for use with subsequent events and/or other communications that are associated with the same session. In other embodiments, the host device can manage the session IDs and identify communications associated with a session based on an IP address of the consumer device, an IP address of the host device, a port identifier associated with the user device, a port identifier associated with the host device, and/or the like In this manner, each of the 1000 consumers using the application can have a dedicated topic and session to which event messages can be sent (i.e., via the corresponding user device) and tracked. If at any time, for a given session, the combination of event messages for that session identify an action (e.g., identified via the analysis service), such as transmission of a message, the help topic module can be used to asynchronously return the message to the consumer.

Figure 5:
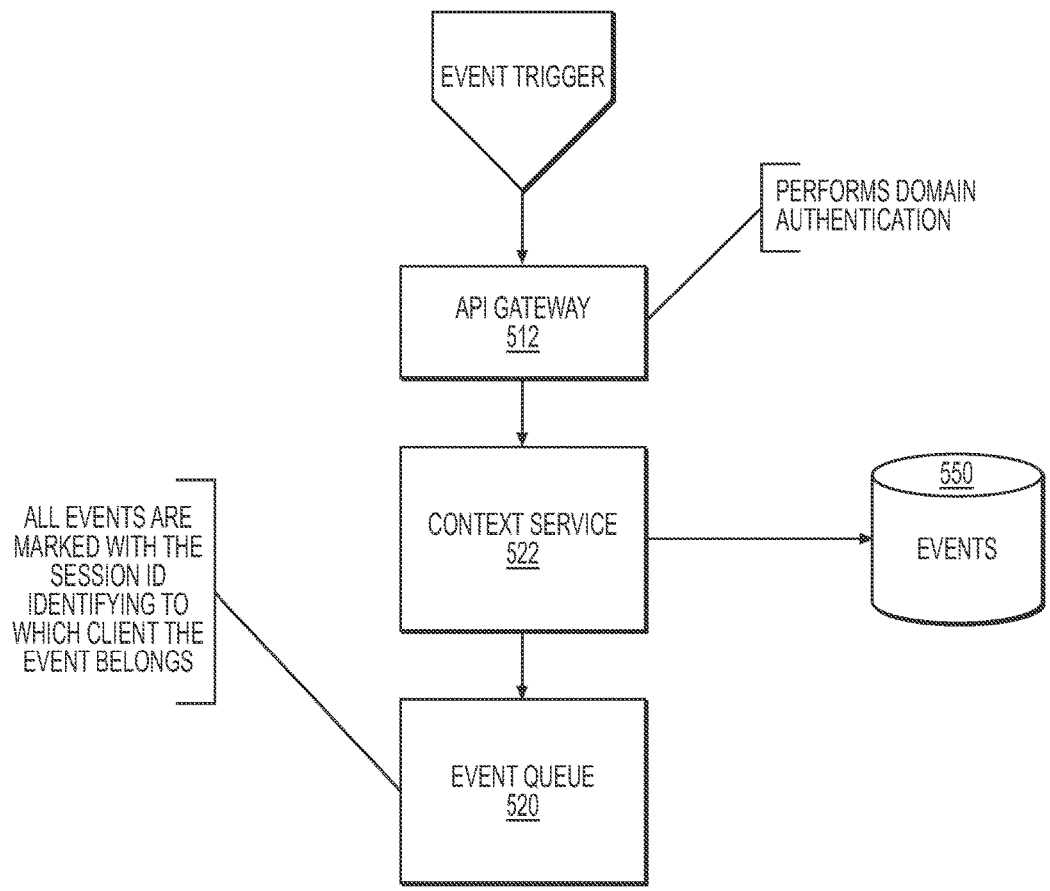
FIG. 5 illustrates example operation of a context service, according to embodiments.

FIG. 5 is an example flow chart illustrating operation of a context service 522, which can be similar to the context service 122. The context service 522 receives the event messages from the API gateway 512, stores the event messages and/or an indication thereof to the memory and/or the database (indicated by reference character 550), and places the event messages in the appropriate event queue 520 based on the session ID. In this manner, the user devices using the host device 106 can transmit event notices/information that correlate to specific events of interest for tracking by the host device 106. The event messages are marked and/or otherwise associated with the same unique session ID used to create a topic so that when certain events or a chain of events (e.g., identified via the analysis service) occur, an appropriate action can be initiated, such as returning a message to the corresponding consumer.

Figure 6:
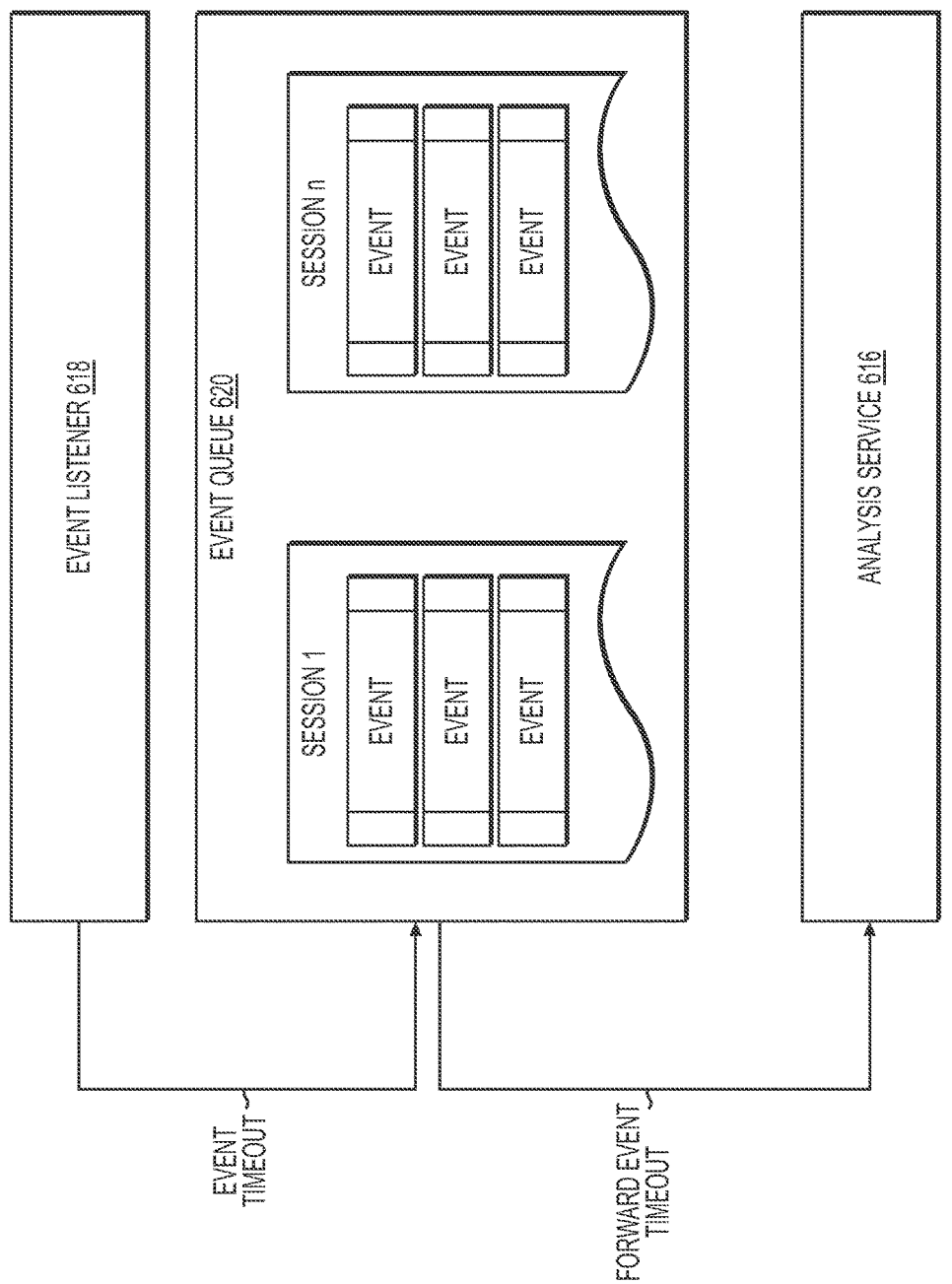
FIG. 6 illustrates example operation of an event listener and an event queue, according to embodiments.

FIG. 6 is an example flow chart illustrating operation of an event listener 618 (e.g., similar to the event listener 118) and an event queue 620 (e.g., similar to the event queue 120). The event queue captures the event messages associated with corresponding events, and the event listener 618 determines if one or more conditions are met by the event(s). For example, the event listener 618 can track when an event times out. An event can be considered to time out when, for example, a subsequent event message is received that renders the event redundant, unnecessary, incompatible, and/or the like. Additionally or alternatively, an event can be considered to time out when a predetermined idle time for the event is achieved. For example, if a first event message in the event queue 620 specifies that the user has placed an item in a shopping cart but has not checked out, then a second event message that specifies that the user has purchased the item and completed the transaction would cause the event listener 618 to determine that the first event message has timed out, and move the first event message to the analysis service 616. On the other hand, if the second event message is not received within (for example) 5 minutes of the first event message, the event listener 618 would determine that the first event message has timed out, and move the first event message to the analysis service 616.

When an event times out, an event message associated with the event is placed in the appropriate session queue (i.e., based on its associated session ID) via transmission to the event queue 620. The event queue 620 determines if one or more forwarding conditions are met for a particular session, for a subset of events (e.g., related to a specific user/consumer context) for the particular session, for a single event for the particular session, and/or the like. For example, the event queue 620 can determine that a forwarding time out condition has been met by a set of event messages in a specific session queue. In an example embodiment a single event specifying one interaction point with the consumer, such as the consumer adding a product to a shopping cart, with a forwarding timeout set to 3 minutes, would expire after 3 minutes and then be forwarded from a queue in the event queue 620 to the analysis service 616 for processing.

Figure 7:
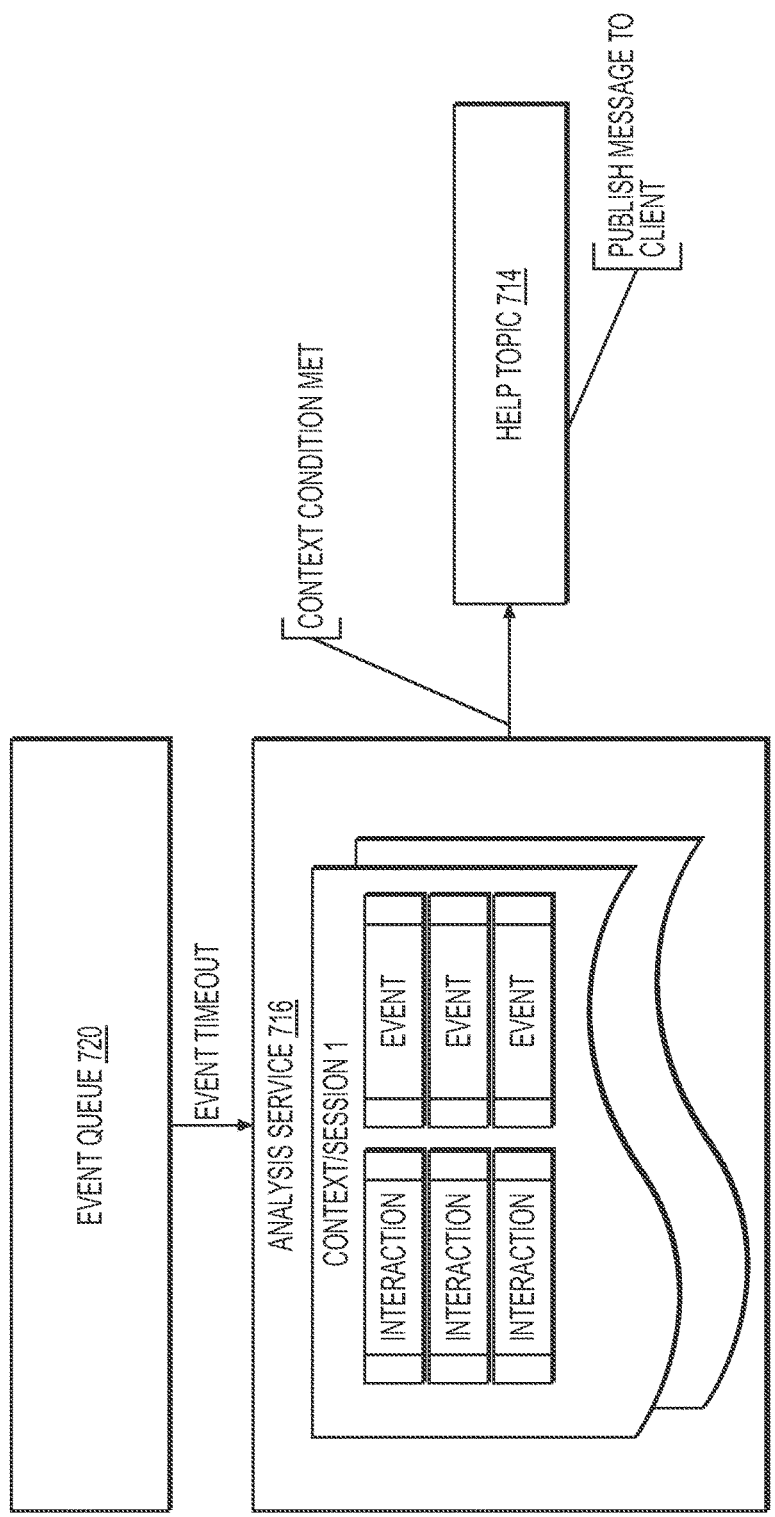
FIG. 7 illustrates example operation of an analysis service, according to embodiments.

FIG. 7 is a flow chart illustrating operation of the analysis service 716, which can be similar to the analysis service 116. The analysis service 716 is configured to receive multiple event messages for each consumer session. Each event message is associated with one or more interactions with the consumer. A specific "context" can be identified once particular event messages are analyzed by the analysis service 716 to conform to that specific context/state. Once the context/state is identified, the analysis service 716 is configured to make a determination such as, for example, whether or not a message is returned to the consumer for invoking support. In some embodiments, the determination can be made based on historical information (such as account information, event/activity history, etc.) associated with one or more of the consumer, the consumer device (e.g., a device IP address), the user device, and/or the like.

Figure 8A:
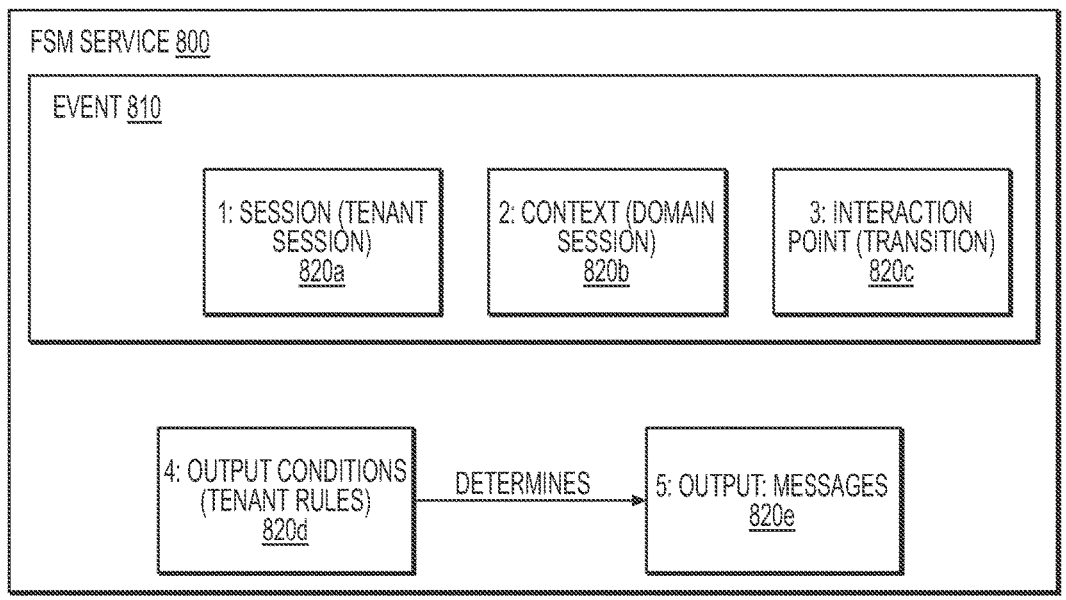
FIG. 8A illustrates an example analysis/finite state machine service, according to embodiments.
Figure 8B:
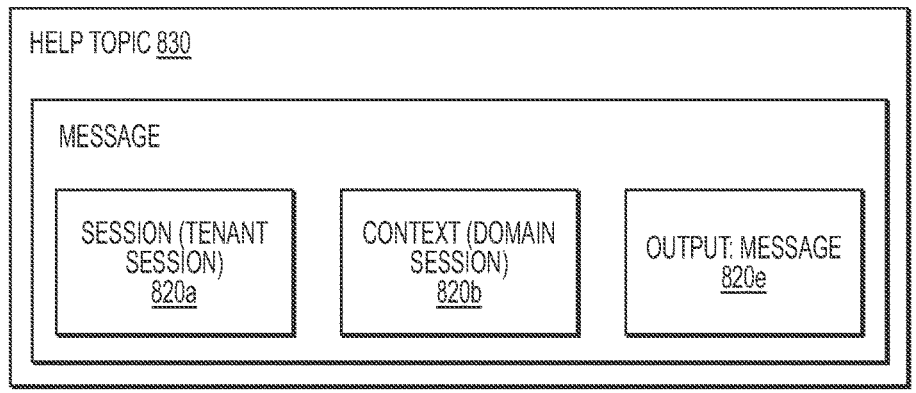
FIG. 8B illustrates an example help topic object, according to embodiments.

FIGS. 8A-8B illustrate example data structures, files, tables (generally, "objects") that can be employed by the various systems, devices, and methods disclosed herein, according to example embodiments. FIG. 8A illustrates an FSM Service 800, which can be illustrative of operation of the host device 106, according to an embodiment. An event object 810 that is manipulated by the FSM (finite state machine) service 800 can encapsulate the following, as illustrated:

1. A tenant session UUID (Universally unique identifier) 820a—an identifier provided by the user device that is specific to the consumer's account with the user device, e.g., an Amazon.com username/identifier for an Amazon.com web session that is generated by Amazon.com;

2. A context session UUID 820b—similar to the session identifier associated with tracking a single session between the user device and the consumer device, described above; and 3. An interaction point 820c—The "last" transition and input entered by the user/consumer In this manner, the user device can associate a known consumer (via the tenant session UUID) with a particular session of that consumer (via the context session UUID) being monitored for events. The transition can be any suitable user input(s), event(s) and/or condition(s) deemed worthy of monitoring by the user device/business entity associated therewith for a particular session. If the interaction between the consumer device and the user device is considered to model a finite state machine (i.e., it can exist in one of a limited number of states), a transition can be one that transitions the interaction to a new state.

FIG. 8A also illustrates that the FSM service 800 includes "tenant rules" 820d that can be defined by the entity associated with the user device (e.g., Amazon) and stored in the FSM service 800. The tenant rules 820d can determine the action(s) that are taken when some events are received, such as the output message "May I assist you?". FIG. 8A also illustrates that the FSM service 800 can then define the output message/output object, which is then pushed to the corresponding Help Topic (see FIG. 4).

FIG. 8B illustrates a help topic object 830 that is generated by the help topic component/module based on the received output message/output object. The help topic object 830 can include the Message/output object 820e, the tenant session UUID 820a, and the context session UUID 820b.

Figure 9A:
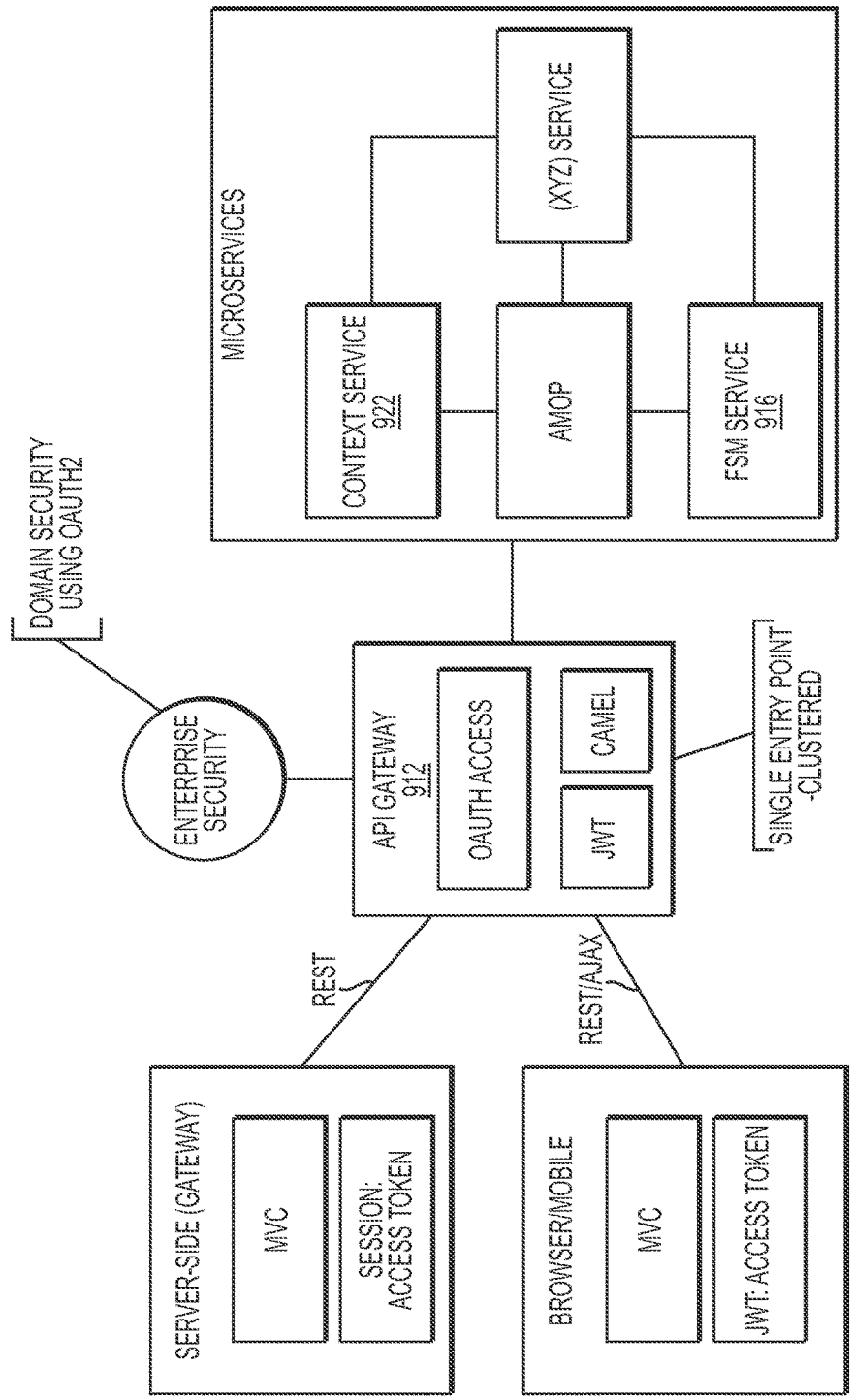
FIG. 9A illustrates example operation within the environment of FIG. 1, according to embodiments.
Figure 9B:
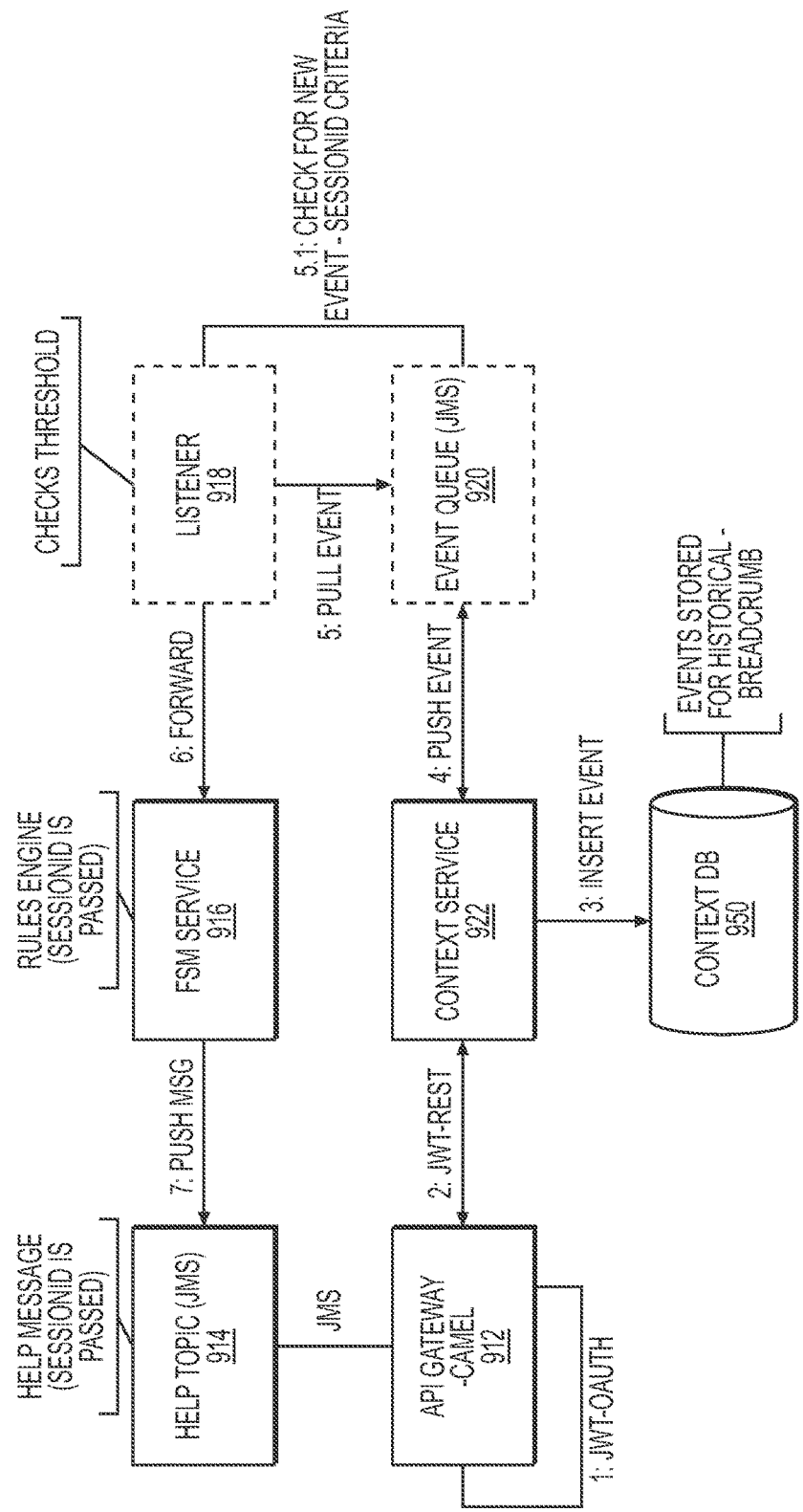
FIG. 9B illustrates an example of information processing and flow between the various components/modules of FIG. 3, according to embodiments.
Figure 9C:
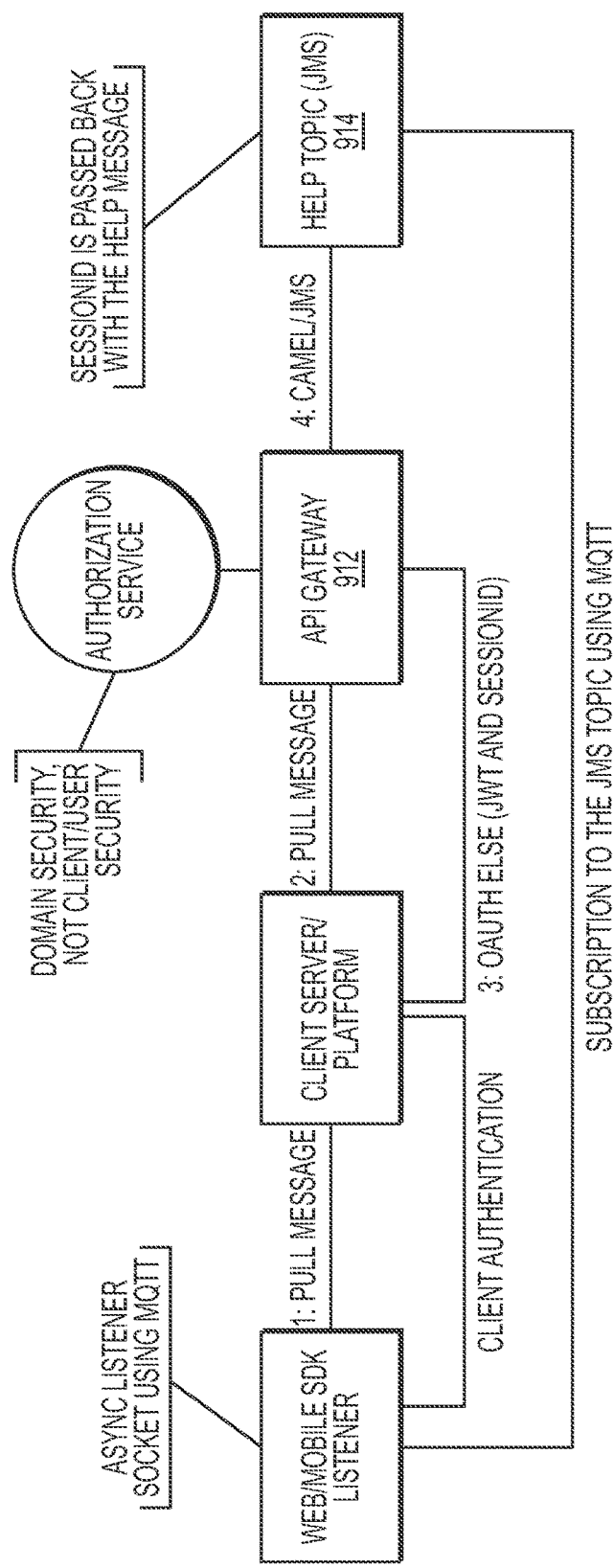
FIG. 9C illustrates an example listening approach of a user device, according to embodiments.

FIGS. 9A-9C illustrate example aspects of the system 100. FIG. 9A illustrates the API gateway 912 and a 'Microservices' cluster that includes, among other services, a context service 922. The API gateway 912 implements multiple authentication protocols as illustrated, including Oauth (Open authorization), JWT or JavaScript Object Notation (JSON) Web Token (domain authentication, not user authentication), and Camel. The API gateway 912 can be configured to receive event messages from both other server gateways (e.g., Amazon, similar to the user devices 102a-102n described herein) and, either directly (as illustrated here) or via user devices (not shown), from consumer mobile devices.

In this manner, the API gateway 912 manages secure access and delegation of requests to one or more of the microservices. The setup of FIG. 9A permits adding services, maintaining, monitoring, and securing services without interrupting or taking down the overall system. The API gateway 912 acts as a proxy, tracking state via JWT, and delegating received information to the appropriate service(s) depending on the API call and/or state. In the example embodiment of FIG. 9A, messaging (e.g., to the user devices 102a-102n) is handled through Camel, allowing for less coding and robust commination (e.g., allowing for error handling and/or failover). Messaging activity can use the Advanced Message Queuing Protocol (AMQP), and is processed through the microservice ActiveMQ. The workflow for user engagement can be handled through the finite state machine or FSM.

Some of the benefits of the API gateway 912 include, but are not limited to: shielding the user devices and/or the consumer devices from how the host device is partitioned into microservices; shielding the user devices and/or the consumer devices from the problem of determining the locations of the various services; providing an API tailored for each user device and/or consumer device; reducing the number of requests/roundtrips (for example, the API gateway module can enable user devices to retrieve data from multiple services with a single round-trip; fewer requests mean less overhead and a better user experience); and simplifying the user device and/or the consumer device by moving logic for calling multiple services from the user device and/or the consumer device to API gateway 912.

FIG. 9B is an example illustration of the context service 922 in relation to the event driven services, other components/modules. Generally, the information flow illustrated in FIG. 9B is designed to receive event information, messages, and/or notifications from the user device (via the API gateway), to place the event in an appropriate queue based on its source/origin, to determine that event is ready for analysis when certain real-world criterion are met, and to intervene in the ongoing interaction between a consumer device and the user device based on event analysis, thereby facilitating the consumer/consumer device in completing the desired task at the optimal time, and in the optimal manner.

The context service 922 addresses the "who, what, when, where" (w4), forming a "breadcrumb trail" of the consumer activity/interaction. All of the various steps/actions of the components/modules described herein are asynchronous, allowing for continuous flow of event information from the user devices 102a-102n to the host device 106. In some embodiments, API calls from the client to the API gateway 922 use REST (RESTful) API and in JSON format. In some embodiments, API calls from the API gateway and queue/topics are handled by Camel.

FIG. 9B illustrates how, at step 1, authentication for received event information is carried out using JWT-Oath by the API Gateway 912. At step 2, the event information is passed to the context service 922 using JWT-REST. The event message is added to a context database 950 (e.g., the database of the host device 106) at step 3, and pushed into an event queue 920 at step 4. The queue listener 918 pulls at the event message from the event queue 920 at step 5, and substantially continuously or substantially periodically checks for new event messages (for the same session, based on the session ID) at step 5.1. When a predetermined threshold of event messages is reached, the event message is forwarded to the analysis service/FSM service 916 at step 6. The analysis service/FSM service 916 analyzes the event messages and identifies a message that is pushed to the help topic 914 at step 7. The message is transmitted to the API gateway 912 for transmission to the appropriate user device. A Session ID is passed with the event and the help topic message for relating message to the correct consumer device.

FIG. 9C illustrates an example embodiment where the consumer device ("web/mobile SDK-listener") includes a listener using asynchronous messaging over a WebSocket or AJAX library (e.g., JQuery, AngularJS) to pull help messages from the help topic component/module, and it is understood that, in some embodiments, generally any consumer device that supports web sockets and HTTP (Hyper-Text Transfer Protocol) can include a listener component/module. The consumer device criterion for checking for the help messages on the help topic can include an arbitrary period, depending on the consumer needs such as, for example, shopping cart help vs billing form help. The listener's API calls pass through the API gateway 912 to the help topic 914 (JMS). The OAuth token (stored in session) and JWT session application/claim is verified prior to the help topic pull.

Figure 10A:
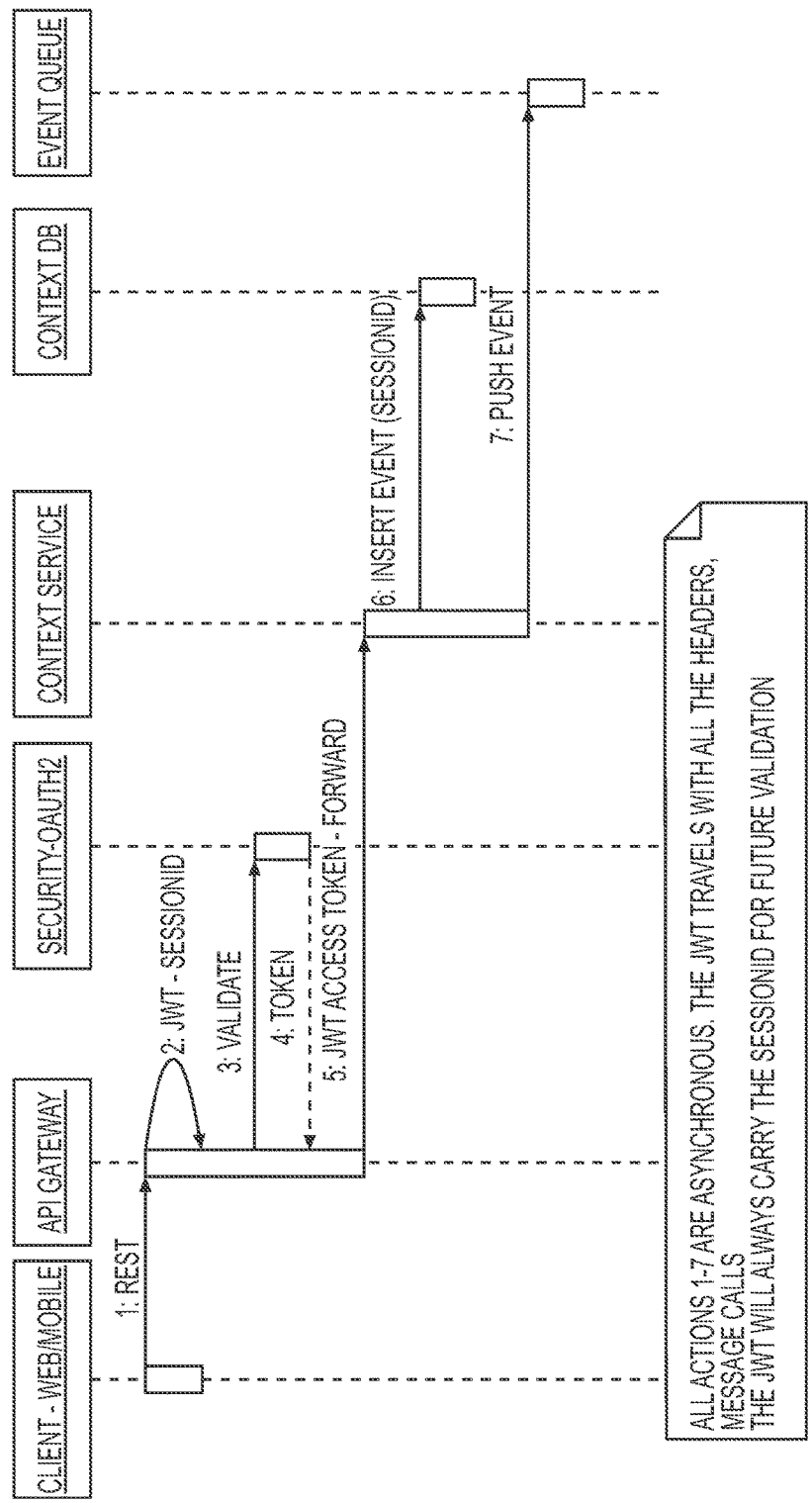
FIG. 10A illustrates an example push approach for event transmission, according to embodiments.

FIG. 10A illustrates an example "data capture" process that occurs when one of the user devices 102a-102n transmits interaction points/event messages to the host device 106, where the context service component/module writes those interactions/event messages to the database. The example sequence of events can be as follows (with reference to FIG. 3):

Step 1—The RESTful JSON message (with token and JWT in the header) is sent to the API Gateway 112 to get passed to the supporting service, such as the context service 122.

Step 2—The JWT application/claim is checked for the context sessionID to verify the session; if the session is not valid then a check is made for the OAuth (step 3).

Step 3—If the JWT sessionID is not valid then it is verified through OAuth, with authentication code, client ID+secret (i.e., public client identification information+private client identification information) into an application/claim set in the JWT. If still not valid, then the appropriate forbidden error is transmitted back to the user device. In some instances, OAuth is used for domain security, not client user security.

Step 4—The access token is returned back from the OAuth service, to be stored in the context session. The context sessionID is stored in the JWT.

Step 5—The API calls are forwarded to the context service 122. This is determined through the JWT application/claim state (context state, FSM state, XYZ service state).

Step 6—The interaction points/event message(s) associated therewith are added to the database 150, for breadcrumb and historical data.

Step 7—The event message is pushed to the event queue 120 for the listener to check threshold limit such as 30 seconds or 5 minutes to determine the next workflow step.

Figure 10B:
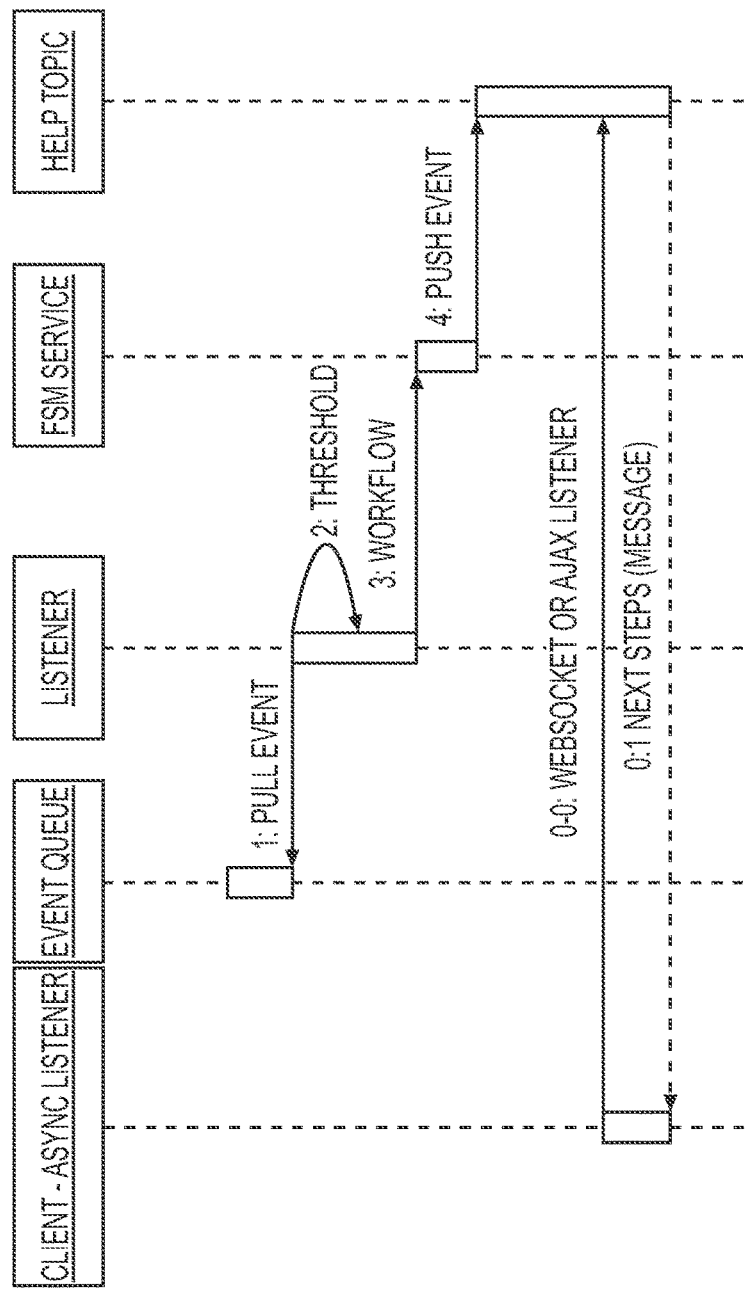
FIG. 10B illustrates an example pull approach for event retrieval, according to embodiments.

FIG. 10B illustrates an example "pull" process that occurs when the web/mobile listener, subscribes to the help topic module (JMS). The user device has a periodic clock/timer checking for a help message to determine if the consumer needs to be connected to the agent. In some embodiments, the clock/timer interval ("heartbeat") is user defined, and can be on the order of milliseconds, seconds, minutes, hours, days, and/or the like. Event messages are tracked and related to interaction points by the session ID. The session ID is used to link the user back to context data, which can be published able to entities that can engage the consumer such as, for example, Customer Service agents of the entity associated with the user device.

Step 0-0—The user device has a periodic clock/timer to initiate checking of the help topic 114 for incoming messages, potentiality, alerting the agent and connecting the user/consumer to the agent for substantially real-time service help. Messages contain the sessionID which can be tied back to the context data for the agent to pull.

Step 1—The event listener 118 pulls the event message from the event queue 120 and checks the threshold to determine the next step. Event messages can contain the sessionID, which can be tied back to the event/context data.

Step 2—The threshold check can be a "timer" indicating the next step is to forward to the analysis service/finite state machine (FSM) 116 for workflow help or discard the event message (e.g., if the consumer is still active and/or does not need help).

Step 3—If the timer exceeds the limit (compared against the start time of the event with the event threshold) then the workflow engine instantiates a help message between the consumer device and user device. The FSM 116 can pull the "type" from the event message and relate it to a rule set for that state. In this manner, what message to show or if the context has ended can be determined (e.g., show no message and/or show the consumer a survey).

Step 4—The FSM 116 identifies/determines the workflow help message based on the state of the event. If help is identified as appropriate, then the help message is pushed to the help topic 114. Help messages contain the sessionID, which can be tied back to the context data for the agent to pull.

Step 0-1—If it is determined by the FSM 116 that help is appropriate for a consumer, then a help message in JSON format is returned. Otherwise, the return message is a JSON message with HTTP Status of "OK". Event messages are tracked and related back to the interaction points/event(s) by the sessionID, which can be passed back in the help message.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, and/or files containing higher-level instructions that are executed by a computer using an interpreter. For example, embodiments may be implemented using C, Java, C++, MATLAB or other programming languages and/or other development tools.

The processor(s) can be any processor (e.g., a central processing unit (CPU), an application-specific integrated circuit (ASIC), and/or a field programmable gate array (FPGA)) configured to execute one or more instructions received from, for example, a memory. In some embodiments, the processor(s) can be a Reduced Instruction Set computing (RISC) processor. The processor(s) can be in communication with any of the memory and the network card. In some embodiments, the processor(s) can accordingly send information (e.g., data, instructions and/or network data packets) to and/or receive information from any of the memory and the network card.

The memories disclosed herein can be any memory (e.g., a RAM, a ROM, a hard disk drive, an optical drive, other removable media) configured to store information (e.g., one or more software applications, user account information, media, text, etc.). The memories can include one or more modules performing the functions described herein. In some embodiments, the functions described herein can be performed by any number of modules. For example, in some embodiments, the functions described herein can be performed by a single module.

The memories can also alternatively store one or more resources (e.g., software resources such as drivers, code libraries, etc.) associated with one or more of the modules. The network card can be a hardware module (e.g., a wired and/or wireless Ethernet card, a cellular network interface card) configured to transmit information (e.g., data packets, cells, etc.) from and receive information at the system 100.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed:

1. A method for communicating with a customer while the customer is engaged in an online session with a vendor, the method comprising:

providing a host device that is in communication with a user device of the vendor, the user device also in communication with a consumer device of the customer during the online session;

building an event queue to track the progress of the customer during the online session, wherein the event queue comprises event messages received at the host device from the user device, the event messages corresponding to activities of the customer during the online session;

determining that one or more event messages in the event queue meet a condition;

analyzing the one or more event messages to identify a context of the condition;

creating, based the condition and the context of the condition, a help message for the customer; and intervening in the online session by providing the help message to the consumer device of the customer.

2. The method according to claim 1, wherein the user device is a sever hosting an online business.

3. The method according to claim 2, wherein the consumer device is a smart phone running an application provided by the online business.

4. The method according to claim 1, wherein the building the event queue, comprises:

associating a received event message with the event queue based on a session identifier in the event message.

5. The method according to claim 4, wherein the session identifier is an IP address or a port identifier.

6. The method according to claim 4, wherein the session identifier is a universally unique identifier (UUID) provided by the user device that is specific to an account of the customer.

7. The method according to claim 1, wherein the one or more event messages comprise adding an online product to an online cart.

8. The method according to claim 7, wherein the condition is an elapsed period of time after the customer added the online product to the online cart without purchasing the online product.

9. The method according to claim 1, wherein the providing the help message to the consumer device comprises:

transmitting the help message from the host device to the user device, which in turn, transmits the help message to the consumer device.

10. A system for communicating with a customer while the customer is engaged in an online session with a vendor, the system comprising:

a consumer device of the customer;

a user device of the vendor, wherein the user device and the consumer device communicate during the online session;

a host device in communication with the user device of the vendor, wherein the host device comprises a processor configured to:

build an event queue to track the progress of the customer during the online session, wherein the event queue comprises event messages received at the host device from the user device, the event messages corresponding to activities of the customer during the online session;

determine that one or more event messages in the event queue meet a condition;

analyze the one or more event messages to identify a context of the condition;

create, based the condition and the context of the condition, a help message for the customer; and intervene in the online session by providing the help message to the consumer device of the customer.

11. The system according to claim 10, wherein the user device is a sever hosting an online business.

12. The system according to claim 11, wherein the consumer device is a smart phone running an application provided by the online business.

13. The system according to claim 10, wherein to build the event queue, the processor is configured to:
associate a received event message with the event queue based on a session identifier in the event message.

14. The system according to claim 13, wherein the session identifier is an IP address or a port identifier.

15. The system according to claim 13, wherein the session identifier is a universally unique identifier (UUID) provided by the user device that is specific to an account of the customer.

16. The system according to claim 10, wherein the one or more events comprise adding an online product to an online cart.

17. The system according to claim 16, wherein the condition is an elapsed period of time after the customer added the online product to the online cart without purchasing the online product.

18. The method according to claim 10, wherein to provide the help message to the consumer device, the processor is further configured to:
transmit the help message from the host device to the user device, which in turn, transmits the help message to the consumer device.

19. A non-transitory computer readable medium (CRM) containing computer readable instructions that when executed by a processor of a host device, which is in communication with a user device of a vendor, cause the host device to:
build an event queue to track the progress of a customer during an online session with the vendor, wherein the event queue comprises event messages received at the host device from the user device, the event messages corresponding to activities of the customer during the online session;
determine that one or more event messages in the event queue meet a condition;
analyze the one or more event messages to identify a context of the condition;
create, based the condition and the context of the condition, a help message for the customer; and
intervene in the online session by providing the help message to a consumer device of the customer.

20. The non-transitory computer readable medium according to claim 19, wherein to build the event cue the processor is further configured by the non-transitory CRM to:
associate a received event message with the event queue based on a session identifier in the event message.

* * * * *